United States Patent
Cole et al.

(10) Patent No.: US 9,438,499 B2
(45) Date of Patent: Sep. 6, 2016

(54) APPROXIMATION OF THE PHYSICAL LOCATION OF DEVICES AND TRANSITIVE DEVICE DISCOVERY THROUGH THE SHARING OF NEIGHBORHOOD INFORMATION USING WIRELESS OR WIRED DISCOVERY MECHANISMS

(71) Applicants: Robert M. Cole, Louisville, KY (US); Patrick C. Lankswert, Prospect, KY (US); Charlie D. Lenahan, New Albany, IN (US); Christopher M. Songer, Louisville, KY (US); Ahmad J. Mirani, Louisville, KY (US)

(72) Inventors: Robert M. Cole, Louisville, KY (US); Patrick C. Lankswert, Prospect, KY (US); Charlie D. Lenahan, New Albany, IN (US); Christopher M. Songer, Louisville, KY (US); Ahmad J. Mirani, Louisville, KY (US)

(73) Assignee: INTEL CORPORATION, Santa Clara, CA (US)

( * ) Notice: Subject to any disclaimer, the term of this patent is extended or adjusted under 35 U.S.C. 154(b) by 327 days.

(21) Appl. No.: 13/839,502

(22) Filed: Mar. 15, 2013

(65) Prior Publication Data
US 2014/0068059 A1  Mar. 6, 2014

Related U.S. Application Data

(60) Provisional application No. 61/697,524, filed on Sep. 6, 2012.

(51) Int. Cl.
*G06F 15/16* (2006.01)
*H04L 12/26* (2006.01)
*H04L 12/24* (2006.01)

(52) U.S. Cl.
CPC ............... *H04L 43/10* (2013.01); *H04L 41/12* (2013.01)

(58) Field of Classification Search
CPC .............................. H04L 43/10; H04L 41/12
See application file for complete search history.

(56) References Cited

U.S. PATENT DOCUMENTS

| | | | | |
|---|---|---|---|---|
| 6,590,884 B1 * | 7/2003 | Panasik | ..................... | G01S 3/72 370/312 |
| 6,826,606 B2 * | 11/2004 | Freeman et al. | .............. | 709/223 |
| 7,203,665 B2 * | 4/2007 | Donner | .................. | G06Q 10/02 235/382 |
| 7,343,350 B1 * | 3/2008 | Donner | .................. | G06Q 10/02 235/382 |
| 7,379,891 B1 * | 5/2008 | Donner | .................. | G06Q 10/02 235/382 |
| 7,382,271 B2 * | 6/2008 | McFarland | ............ | G05B 15/02 340/539.2 |

(Continued)

FOREIGN PATENT DOCUMENTS

| | | |
|---|---|---|
| JP | 2004-274532 | 9/2004 |
| JP | 2010-178193 | 8/2010 |
| KR | 10-2010-0036883 | 4/2010 |

OTHER PUBLICATIONS

International Search Report/Written Opinion, mail date Oct. 29, 2013, PCT/ISA/210, PCT/ISA/220, PCT/ISA/237, total of 11 pages.

*Primary Examiner* — Moustafa M Meky
(74) *Attorney, Agent, or Firm* — Pillsbury Winthrop Shaw Pittman LLP

(57) ABSTRACT

A method of constructing an approximate spatial representation of electronic devices in a neighborhood of devices is described. The method may include collecting data from electronic devices within a range, wherein the data comprises one or more of a unique identifier for an electronic device, endpoints of original electronic devices, and level of indirection of a discovered endpoint and building a data collection representing a neighborhood of electronic devices from the collected data. The collected data may further include relative distance or received signal strength indication or other information about physical location of the electronic device.

24 Claims, 8 Drawing Sheets

(56) References Cited

U.S. PATENT DOCUMENTS

| | | | |
|---|---|---|---|
| 7,415,424 B1 * | 8/2008 | Donner | G06Q 10/02 235/382 |
| 7,529,713 B1 * | 5/2009 | Donner | G06Q 10/02 705/5 |
| 7,577,575 B1 * | 8/2009 | Donner | G06Q 10/02 705/5 |
| 7,577,619 B1 * | 8/2009 | Donner | G06Q 10/02 705/5 |
| 7,577,620 B1 * | 8/2009 | Donner | G06Q 10/02 705/5 |
| 7,617,159 B1 * | 11/2009 | Donner | G06Q 10/02 705/67 |
| 7,886,335 B1 * | 2/2011 | Chickering | H04L 43/0817 726/1 |
| 8,255,469 B2 * | 8/2012 | Leppanen | G06Q 10/10 709/206 |
| 8,275,826 B2 * | 9/2012 | Kakivaya | G06F 17/30067 709/201 |
| 8,351,656 B2 * | 1/2013 | Spicola | A01K 29/00 356/4.03 |
| 8,364,462 B2 * | 1/2013 | Joy et al. | 704/2 |
| 8,380,846 B1 * | 2/2013 | Abu-Ghazaleh et al. | 709/224 |
| 8,457,441 B2 * | 6/2013 | Joy | G06K 9/481 382/240 |
| 8,731,813 B2 * | 5/2014 | Sheha | G01C 21/20 340/995.1 |
| 8,767,584 B2 * | 7/2014 | Calippe et al. | 370/254 |
| 8,873,650 B2 * | 10/2014 | Zhuang | H04L 5/0037 375/260 |
| 9,049,549 B2 * | 6/2015 | Chang | G06Q 30/0205 |
| 2002/0152299 A1 | 10/2002 | Traversat et al. | |
| 2004/0156326 A1 * | 8/2004 | Chithambaram | H04W 4/02 370/310 |
| 2006/0074494 A1 * | 4/2006 | McFarland | 700/1 |
| 2006/0173781 A1 * | 8/2006 | Donner | 705/50 |
| 2006/0229058 A1 * | 10/2006 | Rosenberg | H04L 67/18 455/404.2 |
| 2006/0251008 A1 * | 11/2006 | Wu | H04W 88/08 370/328 |
| 2006/0253570 A1 * | 11/2006 | Biswas et al. | 709/224 |
| 2006/0265197 A1 * | 11/2006 | Peterson | G06F 17/30241 703/2 |
| 2007/0281632 A1 * | 12/2007 | Poon | H04B 7/0691 455/101 |
| 2008/0086560 A1 * | 4/2008 | Monier et al. | 709/224 |
| 2008/0240052 A1 | 10/2008 | Gupta et al. | |
| 2009/0077022 A1 * | 3/2009 | Cuthbert | G06F 17/30241 |
| 2009/0228974 A1 * | 9/2009 | Ivanov | H04L 41/28 726/15 |
| 2009/0307255 A1 * | 12/2009 | Park | G06Q 10/10 |
| 2009/0324132 A1 * | 12/2009 | Joy | 382/282 |
| 2009/0327312 A1 * | 12/2009 | Kakivaya et al. | 707/10 |
| 2010/0142446 A1 * | 6/2010 | Schlicht | H04W 4/20 370/328 |
| 2010/0306320 A1 * | 12/2010 | Leppanen et al. | 709/206 |
| 2011/0196661 A1 * | 8/2011 | Spicola et al. | 703/11 |
| 2011/0270980 A1 * | 11/2011 | Hayakawa | 709/224 |
| 2011/0274104 A1 * | 11/2011 | Cozzi | H04W 4/021 370/352 |
| 2011/0299570 A1 * | 12/2011 | Reed | H04B 7/0434 375/130 |
| 2011/0306364 A1 * | 12/2011 | Gossain et al. | 455/456.6 |
| 2012/0190386 A1 * | 7/2012 | Anderson | 455/456.3 |
| 2012/0239479 A1 * | 9/2012 | Amaro et al. | 705/14.23 |
| 2012/0317275 A1 * | 12/2012 | Lee et al. | 709/224 |
| 2013/0094653 A1 * | 4/2013 | Bathurst | H04L 29/06 381/17 |
| 2013/0275222 A1 * | 10/2013 | Amaro | G06Q 20/102 705/14.58 |
| 2014/0068059 A1 * | 3/2014 | Cole et al. | 709/224 |
| 2014/0068092 A1 * | 3/2014 | Cole et al. | 709/228 |
| 2014/0075037 A1 * | 3/2014 | Cole et al. | 709/228 |
| 2014/0227977 A1 * | 8/2014 | Segall | H04B 7/0434 455/41.2 |
| 2014/0243011 A1 * | 8/2014 | Pan | H04W 64/00 455/456.1 |
| 2015/0062557 A1 * | 3/2015 | Giacotto | F41G 3/06 356/5.01 |
| 2015/0095423 A1 * | 4/2015 | Albornoz | G06F 1/32 709/204 |

* cited by examiner

APPROXIMATION OF THE PHYSICAL LOCATION OF DEVICES AND TRANSITIVE DEVICE DISCOVERY THROUGH THE SHARING OF NEIGHBORHOOD INFORMATION USING WIRELESS OR WIRED DISCOVERY MECHANISMS

CROSS REFERENCE TO RELATED APPLICATIONS

This application claims priority from U.S. Appl. No. 61/697,524, entitled "Approximation of the Physical Location of Devices and Transitive Device Discovery through the Sharing of Neighborhood Information Using Wireless or Wired Discovery Mechanisms," filed Sep. 6, 2012, to Cole, et al.

TECHNICAL FIELD

This disclosure relates generally to the field of wireless communications, and in particular, to wireless communication systems and methods.

BACKGROUND ART

Peer-to-peer communication between electronic devices or the users of those devices generally requires well-defined physical or wireless media for transmitting and receiving data sent between the devices or users. When the existing connections between devices using such media become unreliable or fail due to transient issues such as, for example, overloading of available bandwidth, interference, increasing linear distance, physical disruption, changing availability of power, or other unforeseen conditions, it generally means disruption of and data transmitted between those devices or between those users.

Although network topologies may be constructed to help ameliorate these conditions, these alternate paths are generally configured a priori, and frequently share a common network protocol or physical media type. If the disruption is not brief, it may result in termination of the data flow between the two devices or the users of those devices.

DETAILED DESCRIPTION

Figure 1:
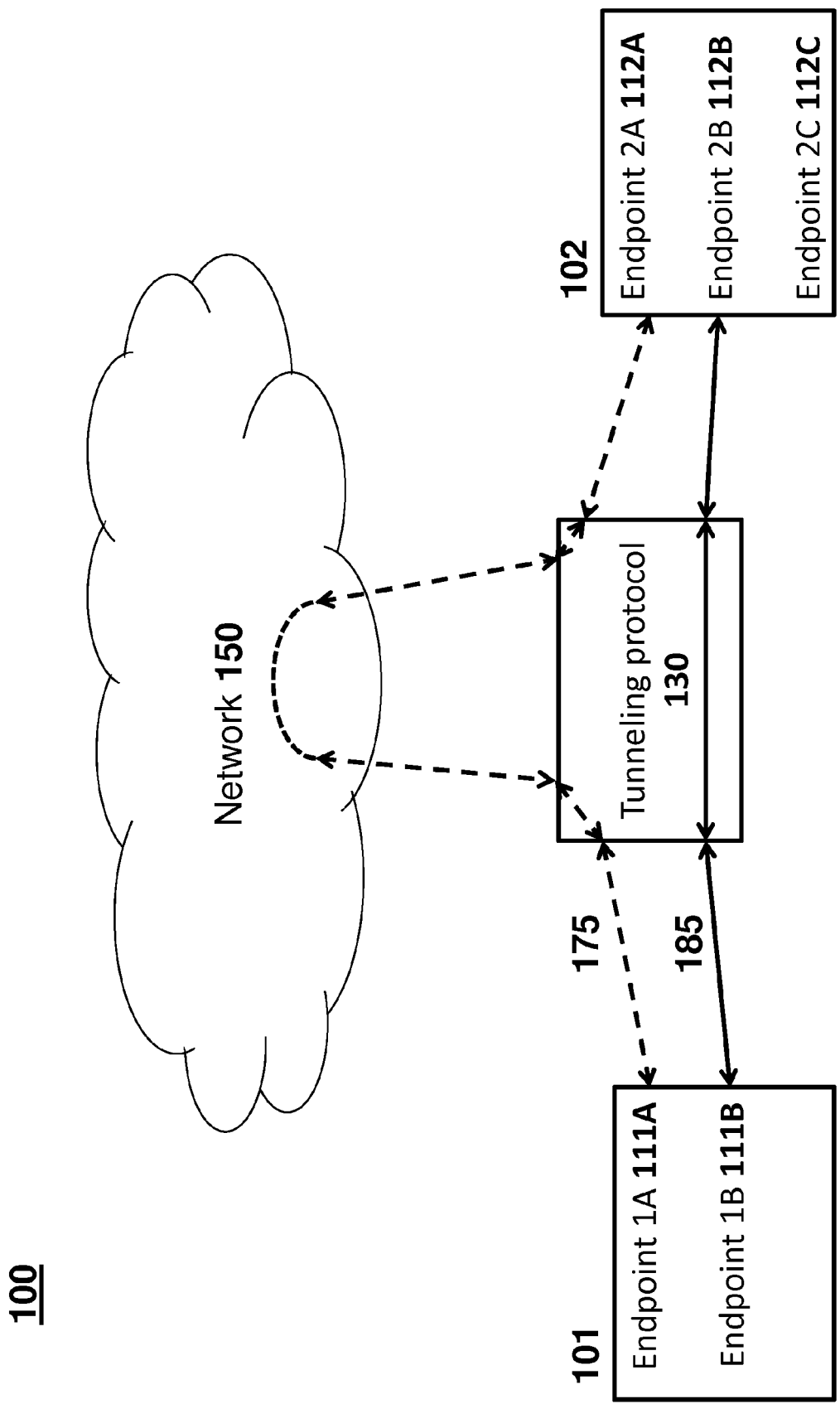
FIG. 1 depicts a wireless communication system employing a tunneling protocol, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a method of constructing an approximate spatial representation of electronic devices in a neighborhood of electronic devices is presented. The method may include collecting data from electronic devices within a range, wherein the data comprises one or more of a unique identifier for an electronic device, endpoints of original electronic devices, and level of indirection of a discovered endpoint, and building a data collection representing a neighborhood of electronic devices from the collected data.

In another embodiment, a method for predicting best pairs of endpoints for establishing a network connection between electronic devices in a neighborhood of electronic devices is presented. The method may include collecting data from electronic devices within a range, wherein the data comprises one or more of a unique identifier for an electronic device, endpoints of original electronic devices, level of indirection of a discovered endpoint, and relative distance or received signal strength indication, building a data collection representing a neighborhood of electronic devices from the collected data, and constructing an approximate spatial representation of electronic devices in a neighborhood of devices using the collected data.

In another embodiment, an electronic device having a processor, in communication with a memory, for executing instructions is presented. The instructions may be to: collect data from electronic devices within a range, wherein the data comprises one or more of a unique identifier for an electronic device, endpoints of original electronic devices, and level of indirection of a discovered endpoint; and build a data collection representing a neighborhood of electronic devices from the collected data.

In various embodiments, a network protocol stack may be constructed for providing seamless data transport and peer-to-peer connectivity between software applications making use of an implementation of the protocol stack. The protocol stack may emulate a subset of a network protocol such as, for example, IPV4, IPV6, ICMP, ICMPv6, ECN, IGMP, IPsec, AppleTalk, IPX, ARP, and the like, for the benefit of the peer-to-peer software using it, and may additionally, provide specific features to the peer-to-peer application for providing solutions to the normal problems of peer-to-peer connectivity not otherwise available through such a network protocol. The protocol may further provide logic for the choice of optimal transport channel to be used for the seamless data transport based on factors such as, for example, available bandwidth, energy consumption of a transport channel, monetary cost, power availability for the completion of the data transport, acceptable latency during transfer of data, and/or the like.

Typically, peer-to-peer communication may include data transfer between two or more peers in applications such as, for example, voice over internet protocol (VoIP), peer-to-peer file uploading, peer-to-peer file downloading, video-over-wireless communication, and the like, or any combination thereof.

A network may include fixed devices, mobile devices, or a combination of both, that are connected by wired links, wireless links, or a combination of both. In various embodiments, wireless links may include, without limitation, WiFi, WiFiDirect, Bluetooth, WiMax, WWAN, any mobile broadband communication system (for example UMTS, CDMA, HIPERMAN, ETSI, BRAN, GSM/GPRS, EDGE, HSPA, LTE, etc.), and the like. Various devices within the network may have, for example, one or more radios, transmitters, receivers, transceivers, chipsets, amplifiers, filters, control logic circuits, network interface cards, antennas, antenna arrays, and the like.

In various embodiments, the network may include fixed devices having wireless communication capabilities such as, for example, a wireless access point (AP), base station or node B, router, switch, hub, gateway, or any combination thereof. A fixed device may have generalized equipment set providing connectivity and/or information to another wireless device, such as one or more mobile devices. In various embodiments, the network may include mobile devices having wireless communication capabilities such as, for example, a computer, server, workstation, notebook computer, handheld computer, telephone, cellular telephone, personal digital assistant (PDA), combination cellular telephone and PDA, and so forth. In some embodiments, the fixed devices or the mobile devices may be capable of running software applications.

Using the protocol stack described herein: (i) peer-to-peer communications between software can be made seamless and require no special algorithmic logic to maintain an existing data connection indefinitely if is used; (ii) peer-to-peer software may use any available supported physical media, such as for example, EIA/TIA-232, EIA/TIA-449, ITU-T V-Series, I.430, I.431, PDH, SONET/SDH, PON, OTN, DSL, IEEE 802.3, IEEE 802.11, IEEE 802.15, IEEE 802.16, IEEE 1394, ITU-T G.hn PHY, USB, Bluetooth, RS-232, RS-449, and the like, while the media used is selected in an optimal manner to minimize energy use and monetary cost, and maximize bandwidth; and (iii) peer-to-peer software, in general, can communicate over a shared network address space without the ability to address other peer-to-peer software on the same network maliciously.

Further, the processes described herein: (i) allow the protocol stack to construct an approximate spatial representation of various electronic devices in the vicinity of a particular electronic device; (ii) allow the protocol stack to make predictions about the best possible pairs of endpoints that can be used to establish network connections between electronic devices; and (iii) allow the protocol stack to determine an efficient path for reliably relaying information between various electronic devices.

As such, any software performing peer-to-peer communication, to recover from the interruption of any ongoing process dependent on this communication, may contain algorithms dedicated to recording the state prior to the interruption of data flow and to reestablishing the state after the medium becomes re-available. Additionally, the presence of alternate physical media that do not normally carry the network protocol used by the peer-to-peer software, but which do provide some medium for digital data, may not be used to avoid disruption of the peer-to-peer communications link without explicit support for the alternate protocols supported by the medium or a tunneling protocol configured over the medium that emulates a network protocol not explicitly supported by the medium expressly for the purpose of avoiding such disruption.

Typically, a virtual network in which all peers share a common address space allowing all involved communicating parties to be addressable on this virtual network constructed of links consisting of media capable of carrying a specific protocol may provide a solution for maintaining connectivity between peers without requiring actions by the software providing or consuming the peer-to-peer data. Because such a virtual network is dependent on the persistence of the media over which they are constructed, it remains vulnerable to connection disruption between devices on the network when all possible links between any two communicating peers are lost.

Moreover, data transmitted between modes in such a virtual network may be routed exclusively through a specific device that is not ideally suited to carrying this data due to transient limitations such as available CPU cycles, battery power, or the bandwidth requirements of software not communicating over the virtual network. Transient loss of this peer may not be observed by the peers routing data through it until the natural timeout of the network protocol carrying the peer-to-peer data indicates the network connection has been lost. At that point, so has the peer-to-peer connection.

If prior to this loss of network connectivity the user of one of the peers enables a new communications medium that is accessible to the other communicating peer such as, for example, Bluetooth, WiFi, WiFiDirect, WiMax, and the like, the two peers must be connected via that new medium through user intervention because neither peer is aware that the intermediate node routing all traffic between the peers is about to experience a connection loss. If such a connection is brought in as a new link in the virtual network prophylactically to avoid a possible loss of peer-to-peer communications and the connection loss does not occur, the new link was not required and the energy required for maintaining the new link between the peers is wasted.

A virtual network may also suffer from security risks as all of the nodes, sharing a common address space, may send data to one another at any time, resulting in the requirement that all peer-to-peer software be hardened against network attacks on the virtual network from other peer operating on the same network.

In some embodiments, the software providing a protocol described herein may run on a device with zero or more types of network media. Typically, when the protocol is started or loaded from a database on the device a universally unique device identifier (UUID) is selected at random or from an authoritative source such that the device may obtain a unique address in the restricted domain of device identifiers acquired in this manner.

With this said, FIG. 1 depicts wireless communication system 100, in accordance with certain embodiments. System 100 may include first electronic device 101 and second electronic device 102 endeavoring to communicate with each other via tunneling protocol stack 130 across wireless media 175 or 185. For example, during initial communication phases, first electronic device 101 may discover second electronic device 102 and make attempts to establish a communication link with user device 102.

User electronic devices 102, 104 may take the form of mobile phones, tablet computers, personal computers, network servers, laptops, smartphones, gaming devices, networking devices, navigation device, wearable computing devices, communication-enabled appliances, etc. Moreover, it will be appreciated that the discovery and communication processes may be proximity-based, such as, for example, through direct pairing, or network-based, such as, for example, attachment to network 150 via network access points. It will also be appreciated that the discovery of peer electronic devices and establishment of communications between such devices may operate under a variety of wireless communication protocols and standards, such as, for example, Wi-Fi, WiFi Direct, WiMax, WWAN, WLAN, WPAN, BlueTooth, BlueTooth Low Energy, Near Field Communications, or any other implementation of a suitable wireless standard. In various embodiments, the discovery and data transfer between peer devices may not happen over the same communication protocol. For example, in some embodiments, an endpoint for a peer device may be determined through the use of a STUN server and the data transfer may occur as UDP packets.

In some embodiments, the devices 101 and 102 may also be hard-wired to a network connected device such as, for example, a router, a switch, a gateway, and the like, or other device such as, for example, a desktop personal computer, a handheld computer, a laptop computer, a server, a workstation, a cellular telephone, a telephone, a personal digital assistant, and the like, which may or may not be capable of making a wireless connection. As such, the discovery and communications between first device 101 and second device 102 is not limited to any specific standard and the examples discussed may be implemented separately or in combination with each other. Thus, while two electronic devices are shown in the figure for simplicity of illustration, various aspects of disclosed herein are applicable to multiple devices present within a certain vicinity.

As will be described in greater detail below, electronic devices 101, 102 may include a local list of endpoints, such as endpoints 111A, 111B and endpoints 112A, 112B, 112C, respectively, to facilitate data connections. Each available network medium 175, 185 present on electronic devices 101, 102 may provide connectivity to any device that also supports data transfer using that type of network medium and implementing tunneling protocol stack 130.

Figure 2:
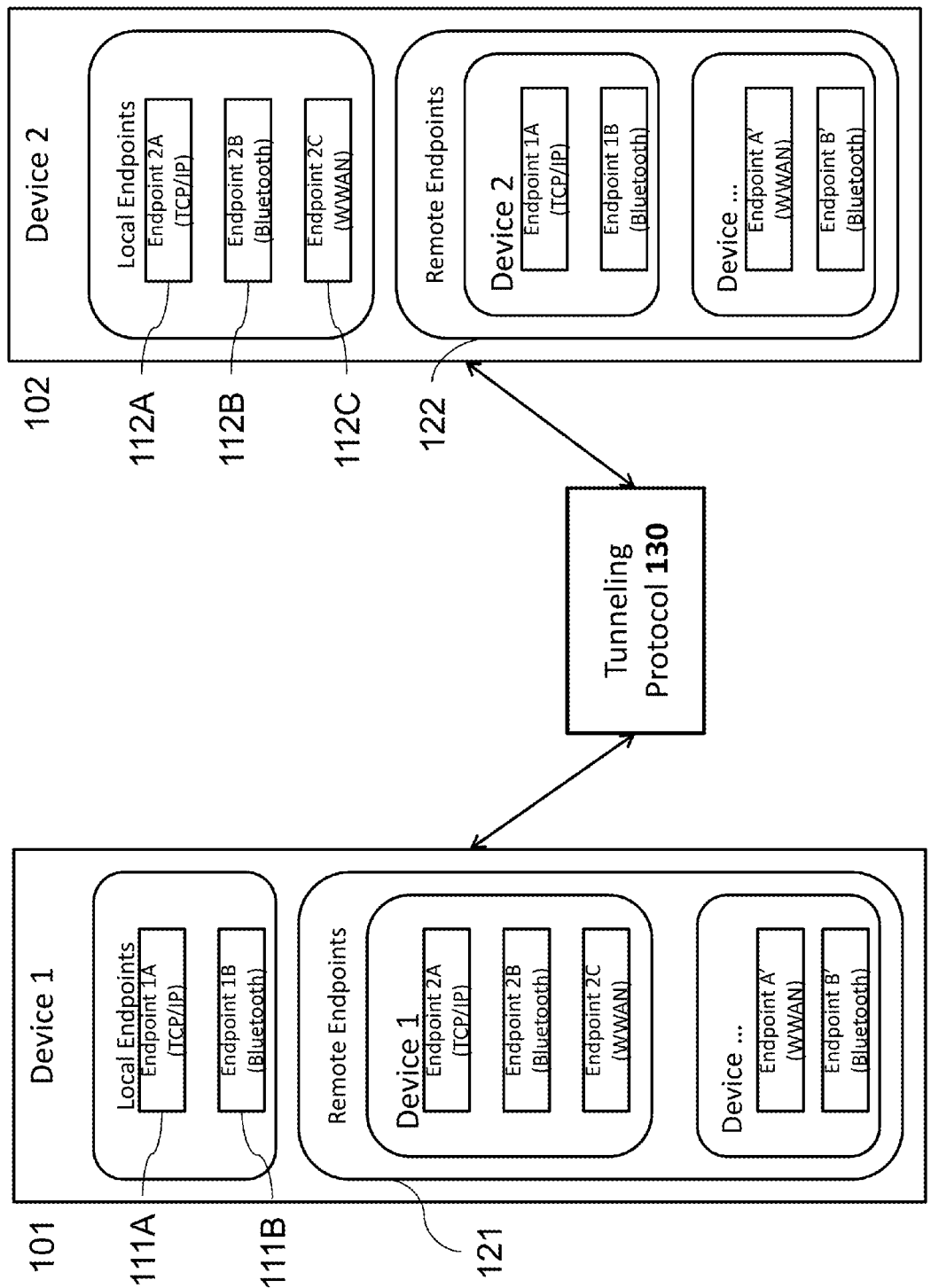
FIG. 2 depicts examples of local and remote endpoints used by a protocol stack in accordance with various aspects and principles of the present disclosure.

Turning to FIG. 2, for all network media types accessible to the tunneling protocol stack 130 such as, for example, Bluetooth, TCP/IP, WWAN, and the like, protocol stack 130 may then establish an address for itself in the address domain as indicated by, for example, endpoints 111A, 111B, 112A, 112B, and 112C, which is provided by the network medium. In this manner, other devices supporting the same network medium may connect to the established address, based on, for example, device type and address values, (dependent on the type and the value of the address) and communicate with the protocol stack 130 while it is executing. As described herein, this address within the context of the electronic devices providing is considered as an "endpoint" on the electronic device to which the other devices may connect.

Each instance of tunneling protocol stack 130, in various embodiments, may retain a local list of endpoints that may be used to establish data connections to it. For example, as noted above, for electronic device 101, the local endpoints are 111A, 111B, while for device 102 the local endpoints are 112A, 112B, and 112C, and so on. This list of endpoints and device identifiers may be then published and updated using any discovery mechanism available to protocol stack 130 using the available local network media. The tunneling protocol stack 130 may either subscribe to changes in the discovery data of other proximal electronic devices or may query that discovery data with a periodicity dependent on factors such as, for example, the type of network medium, nominal power draw of the discovery process for that network medium, etc.

When the device identifier and endpoints of another electronic device are provided, that information may be added to a database, keyed or based on the device identifier, so as to provide information on all of the endpoints that may be used, such as, for example, 121 and 122. By furnishing all endpoints, such information may be used to establish a network connection to remote electronic devices. If a remote electronic device reports the same unique identifier as the local electronic device, no database update is made and a notification of address conflict will be sent to any software providing configuration of the protocol stack 130 on the electronic device. In some embodiments, other sources may be used to update the database of remote devices. For example, a particular endpoint may advertise all available local endpoints on the electronic device. When such an endpoint is discovered, all the advertised endpoints may then be added to the database.

When tunneling protocol stack 130 establishes a data connection between electronic devices, it may select a pair of endpoints where at least one endpoint of the pair is from its own list of endpoints and the other pair's domain exists within an address space which is reachable from the originating endpoint on the local electronic device.

Figure 3:
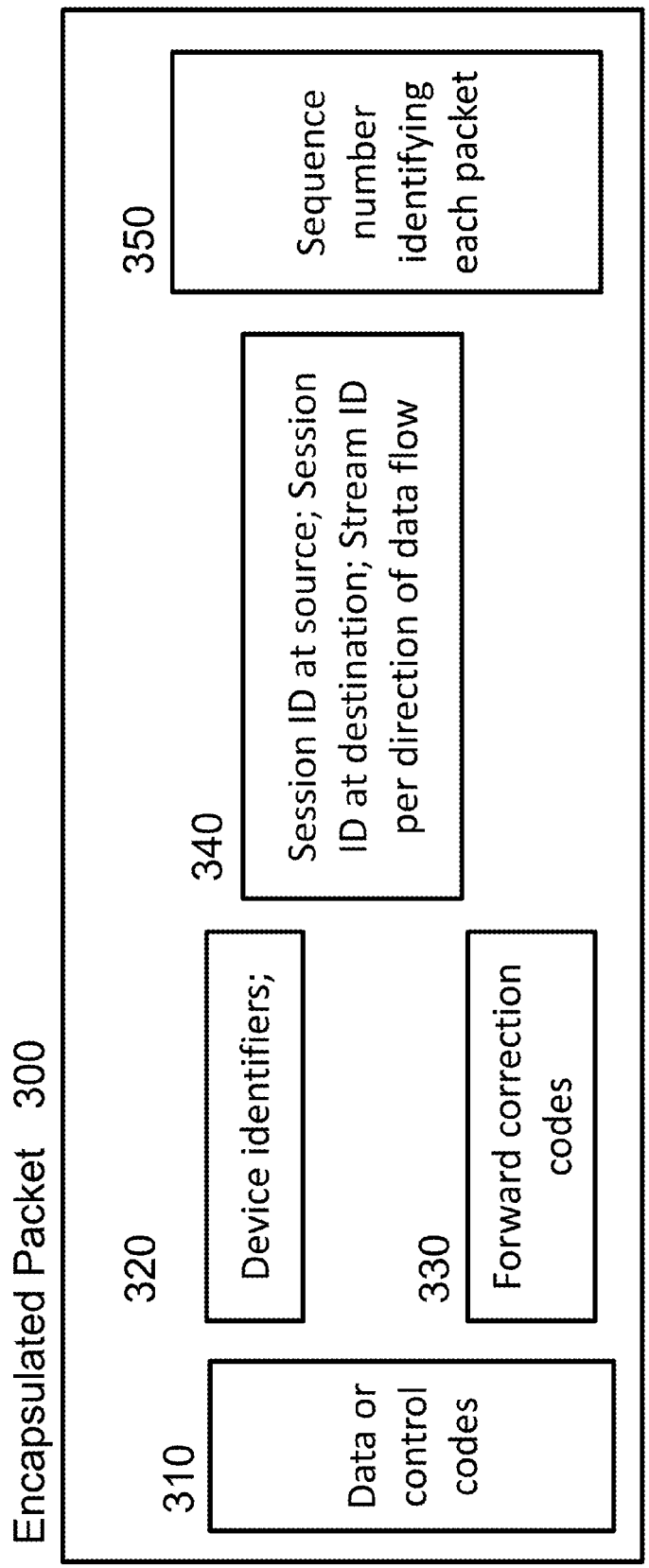
FIG. 3 depicts an encapsulated packet used by a protocol stack in accordance with various aspects and principles of the present disclosure.

FIG. 3 depicts a variable-length data packet 300 that may be supported by protocol stack 130 through data connections. The variable-length encapsulated data packet 300 may be configured to include encapsulated data and/or control codes 310, device identifiers 320, forward correction codes 330, session IDs 340, and packet sequence numbers 350.

Armed with such a configuration, variable-length encapsulated data packet 300 provides information regarding the source and destination electronic devices for the payload data (or control code information) 310 in terms of the protocol stack's device identifiers 320, rather than relying on the addresses of the supporting network. Such a tunneling protocol 130 hides the details of the network medium such that network media with differing OSI layer-three network protocols may be used by the protocol stack interchangeably. The ordered triple of source and destination endpoints and the layer-three network connection provides the OSI layer-four transport channel carrying data between the electronic devices.

The encapsulated data packet 300 may be constructed such that its data payload can be transmitted via any network medium that can provide, at minimum, a bidirectional flow of data between the source and destination devices. If bidirectional data flow is not available over a network medium, a second network medium may be required to provide data flow in the opposite direction and the pair of network addresses in their respective domains of the two unidirectional network media is considered the endpoint. Whenever the network communication medium does not constitute a reliable carrier of data such that bit errors or lost packets may occur, the packet encapsulation may be augmented to provide forward error correction codes 330 for the packet. As noted above, the encapsulated packet 300 may contain either a payload containing data or control codes 310 intended for the destination electronic device or it may contain data or control codes intended for an electronic device visible to the destination device transitively. In other words, the database may be updated dynamically so that the data that is visible to the various devices is not static over time.

The tunneling protocol stack 130 may create one or more users that map to identities, accounts, or human users of the electronic device on which the tunneling protocol stack 130 is started or loaded from a database. Each user may also be given a universally unique user identifier that may be used to identify the user in the domain of all user identifiers. The ordered pair of device identifier and user identifier may then be combined using an injective mapping into a third unique identifier that can identify the presence of a user on an electronic device.

In some embodiments, the tunneling protocol stack 130 may require a session between two or more users on two or more electronic devices to carry a peer-to-peer application's data. In other embodiments, the tunneling protocol stack 130 may require the session to send control codes between two tunneling protocol stack instances. In either instance, the tunneling protocol stack may open a session between the two electronic devices by negotiating a stream between the two electronic devices based in the ordered triple of source session identifier, destination session identifier, and stream identifier 340, as described earlier.

The tunneling protocol stack 130 may find or establish at least one transport channel between the electronic devices for establishing a stream. The encapsulation performed by the tunneling protocol stack 130 allows it to treat transport channels between electronic devices agnostically. This feature allows the tunneling protocol 130 to optimize the selection of transport channels in order to minimize the time required to establish a stream. In embodiments where a transport channel is available such optimization may include selecting an available open transport. In embodiments where no transport channels are available and the stream is intended to carry data for a peer-to-peer application, the optimization may include establishing all possible, and administratively allowed transport channels between the electronic devices simultaneously. In other embodiments, the optimization may follow normal rules of transport channel selection optimization as discussed herein.

In embodiments requiring a peer-to-peer application to duplicate its data packets to multiple sessions, the tunneling protocol stack 130 may reserve a stream identifier 340 as a local group identifier. The tunneling protocol stack 130 may further establish control streams to each of the sessions that may add or remove an ordered pair of session identifier and group identifier from each existing member of the group of sessions receiving the packets. Packets destined for a group may be transmitted to each electronic device of the group such that all electronic devices may receive all packets transmitted to the group stream.

In various embodiments, encryption of data streams may be used to ensure integrity and avoid snooping of the data carried by the stream. In some embodiments, it may be possible to encrypt all data streams in the system by default. In certain embodiments, the control channels may be encrypted with keys from certificates signed against a certificate authority. Such encryption will make it substantially difficult for a peer-to-peer application to connect to another peer application maliciously through the tunneling protocol stack 130 without breaking the encryption. The tunneling protocol stack 130 may be made to require both, the permission of a peer and the knowledge of the presence of a peer-to-peer application prior to the establishment of connections between peer applications.

Once a stream is established, the tunneling protocol stack's stream of encapsulated packets may be transmitted over multiple disparate transport channels. The packet encapsulation for a stream packet may be further augmented to include a monotonically increasing sequence number, 350, used to uniquely identify each data packet 300 in the stream in a single direction of flow from the originator of the packet to its one or more recipients.

In certain embodiments, a packet transmitted through a transport channel may fail to arrive at its destination protocol stack instance within a reasonable time. In such embodiments, a control packet may be sent from the receiving device to the source device to request a retry of a particular sequence number for the particular stream. The reasonable time may be defined by the type of network medium on which the packet is transmitted.

The reasonable time may be some arbitrarily selected but consistent number of standard deviations from the mean time to send a packet of a specific size from a source device to a destination device from the completion of the hardware write of the packet on the source device to its receipt on the destination device such that the probability that the packet arrives in that time is bounded. In some embodiments, this value is dynamically computed from analysis of the time from the packet send to the receipt of an acknowledgement that the packet has been received, but the nature of specific hardware radios provides for a minimum bound for the mean time which cannot be exceeded by the physical medium. For example, a Bluetooth 2.0 EDR (Enhanced Data Rate) radio cannot send data at a rate faster than 3.0 Megabits per second so that a packet of length 10,000 bits (1250 bytes) cannot be transmitted in a time period less than 3.33 milliseconds. The same packet transmitted over a 1.0 Gigabit per second Ethernet twisted-pair cannot take less than 0.01 milliseconds.

Typically, the selection of reasonable time is an approximation; generally an approximation of the worst-case time. However, in embodiments where the measurement of the total bandwidth used is possible, the selection of reasonable time can be precise. In certain circumstances when, for example, radio environment is sufficiently noisy, distance between radios is sufficiently high, or signal is otherwise attenuated, the physical media may transmit at well below their nominal bandwidth. In such circumstances, a wired Ethernet connection through one router hop may transmit a 10K packet within 1 second with a 99% probability, whereas the Bluetooth radio may need as much as 1 minute to transmit the packet with the same probability. In each case the reasonable time is a fraction of the worst-case time; an approximation selected to minimize the chances of loss without delaying a packet retry along that medium such that the flow rate of a stream over the medium would stall for a time equal to a value no greater than the time required to transmit and receive the packet requesting a retry and to transmit and receive the original packet (assuming loss). This approximation, although imprecise, is sufficient to determine that the probability that the packet has not been received along a specific transport is high, and therefore a packet retry may be necessary.

In embodiments where a packet may be transmitted along multiple paths before reaching its destination, the approximation of the reasonable time may become less precise and the correct values harder to predict. In such embodiments, the sum of the worst-case times for all of the transport hops along the path taken by the packet may provide a good estimate for the measure of the reasonable time along that path.

In some embodiments, the control packet requesting a retry may be transmitted to the originating electronic device over an available transport channel that is different from the originally established transport channel. The replayed packet may also be transmitted through any transport channel other than the original transport channel such that the interruption to the stream is minimized. In various embodiments, the electronic device receiving the control packet requesting a retry may transmit a duplicate of the original packet down at least one transport channel different from the transport channel originally used to carry the packet now being replayed.

Typically, the recipient of a series of packets may send an acknowledgement packet at regular intervals to the originating electronic device. The acknowledgement packet, in various embodiments, may include information that all packets prior to a particular sequence number have been received. When a stream has received an acknowledgement from all destination electronic devices indented to receive a packet on a stream of a given sequence number, the packet may be deleted from the cache of packets held by the tunneling protocol stack 130 instance on the originating electronic device.

Figure 4:
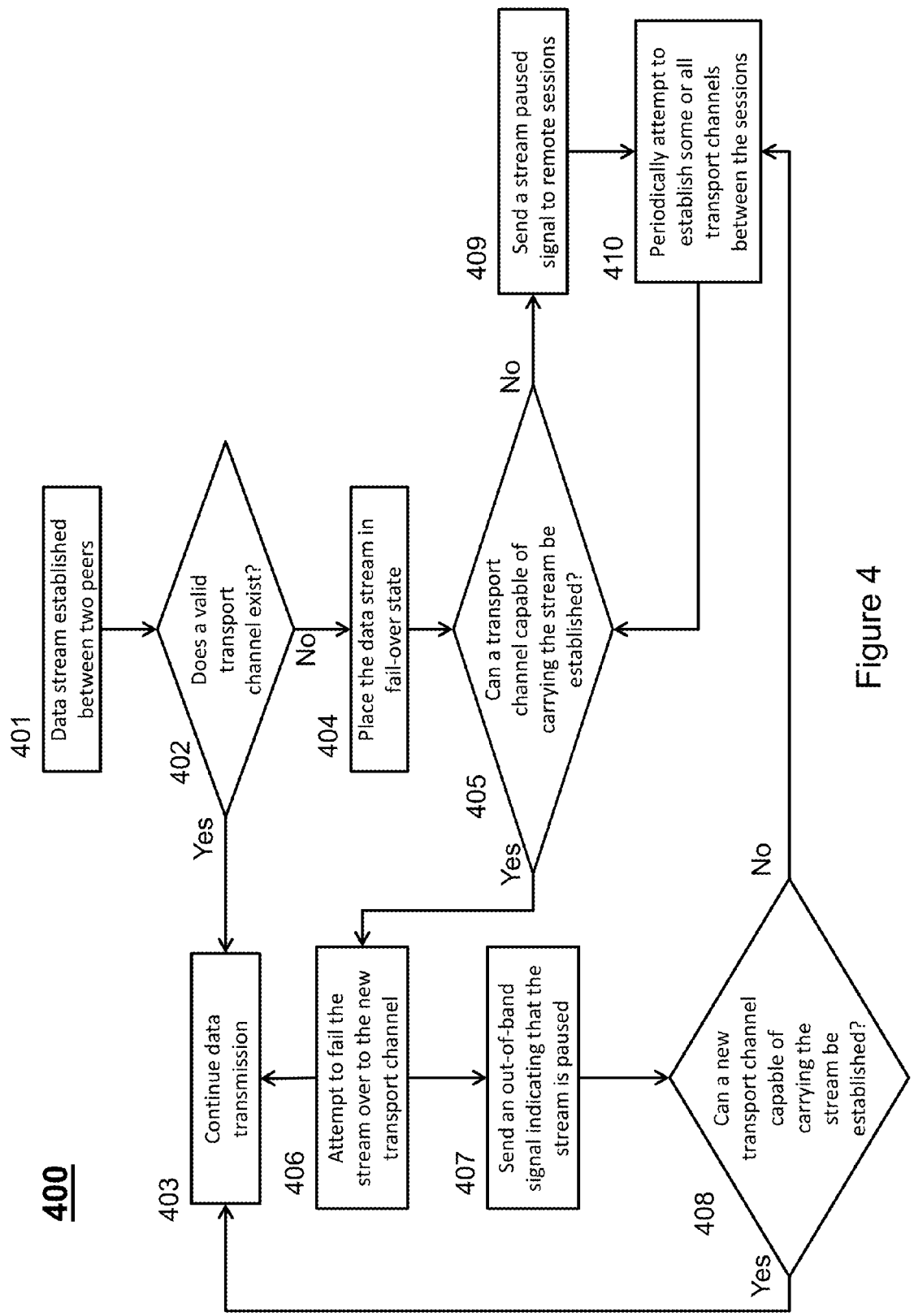
FIG. 4 depicts a flow diagram of a protocol process for determining fail-over state in accordance with various aspects and principles of the present disclosure.

FIG. 4 depicts a flow diagram of protocol process 400 for determining a fail-over state, according to an embodiment disclosed presently. As indicated by step 401, protocol process 400 may establish a communication link and data stream between two peer electronic devices. Once a data stream is established 401, protocol process 400 may repeatedly check if a valid transport channel is available, as depicted by step 402, based on the receipt of an acknowledgement. When a valid transport channel is available, the stream continues uninterrupted, as indicated in step 403.

However, in certain embodiments, a transport channel may become unavailable after a connection between two peers has been established. The transport channel may become unavailable for various reasons including, but not limited to, movement of hardware radios such that the maximum signal strength of the transmitting radio is attenuated below the noise floor for the receiving radio; movement of hardware radios or shift in radio environment such that the signal is attenuated by materials interposed between the radios; disconnection of a wire or interruption of an optical fiber or other physical medium carrying the transport channel, one or more of the communicating parties powering off the electronic device or putting the electronic device to sleep such that the network interface carrying the transport channel is unable to transmit or receive data, one or more of the communicating terminating the protocol stack (because of reasons such as, for example, energy resource allocation, bandwidth allocation, process priority optimization, and so forth), one or more of the communicating parties powering off or disabling the radio or radio technology, or putting the device into "flight-mode" such that the radio is prohibited from transmitting or receiving data, a planned shutdown of the service or medium carrying the transport channel, an unplanned hardware failure of the radio or physical medium, and so forth.

When process 400 determines that no valid transport channel is available for transmitting a packet from the originating electronic device to one or more of the recipient electronic devices, it may not close the stream. In some embodiments, the tunneling protocol stack 130 may place such a stream into a fail-over state, as depicted by step 404 of process 400. Protocol process 400 then determines, in step 405, whether a new transport channel capable of carrying the data payload can be established and if so, the tunneling protocol stack attempts to fail the stream over to the new transport channel, as depicted by step 406, in order to continue the data transmission, as indicated in step 403.

In such embodiments, process 400 provides an out-of-band signal indicating that the data stream has been paused to remote sessions of peer-to-peer applications that use the stream but that can no longer be reached, as indicated in step 407. As a result, subsequent reads and writes of data to that stream may become non-operations.

At step 408, protocol process 400 determines whether a new connection through a new transport channel can be established and if so, process 400 returns back to step 403 where the stream to one or more of its destination sessions is resumed.

If no new transport channel can be established, process 400 forwards a "stream paused" signal to the originating electronic device, in step 409. In such embodiments, as indicated in step 410, the fail-over process may further involve periodic attempts to establish some or all of the transport channels that are possible between the endpoints shared by the electronic devices holding streams in a paused state. The periodicity of the connection attempts may depend on factors including, but not limited to, power draw of the network medium of the transport channel over which the attempts occur, the power availability on the device initiating the connection, hints provided by the peer-to-peer application indicating the relative urgency of the reestablishment of the stream, and the like.

After the periodic attempts to re-establish one or more of the transport channels, process 400 may follow the rules of data transmission as described above, by deciding if a transport channel capable of carrying the stream be established, as indicated in step 405.

Although the stream may remain in the paused state indefinitely, as indicated by the loop formed by steps 405 (No), 409, and 410, the period between attempts to reconnect may gradually increase. In some embodiments, the period between subsequent attempts to reconnect may increase with a hysteresis selected for the type of network medium. In embodiments where the network medium is wireless, the period between subsequent transport channel connection attempts may eventually reach an indefinite period. In such embodiments, the transport may only be resumed if the two electronic devices discover one another anew and their respective protocol stacks connect to one another to exchange any updated metadata describing the discovered sessions.

In embodiments where multiple transport channels are available, packets may be sent down using a transport channel that requires the lowest total energy per bit. In certain embodiments, a higher bandwidth transport may be backlogged such that a number of packets are available from a stream to be written down it. In such embodiments, if at least one other lower bandwidth transport channel is available, the lower bandwidth transport may be used to transmit the packet. The packet may be transmitted with a sequence number that has not been transmitted. In some cases, the packet sequence number may be chosen such that it is far enough back in the existing back-log for the slower transport to transmit the older packet to the destination device before the back-log of packets is fully exhausted to be sent down the faster transport. As such, a slower transport may be used to reduce the back-log of the existing faster transport without increasing latency.

In other embodiments, the transport channel may stream to an electronic device carrying a session such that each packet sent to that electronic device is optimized to minimize the back-log of the transport and maximize the bit rate. In embodiments where at least one transport channel is carrying a stream but at least one other transport may be established, the other transport may be disconnected by performing a dynamic optimization such that only one transport is used. In such embodiments, the fastest transport channel available over an intersection of a set of endpoints may be selected. Alternatively, a transport channel where the protocol will not fail-over may be selected. When control meta-data is shared between two tunneling protocol stack instances, the connected transport channels may be determined through an algorithmic optimizer.

Figure 5:
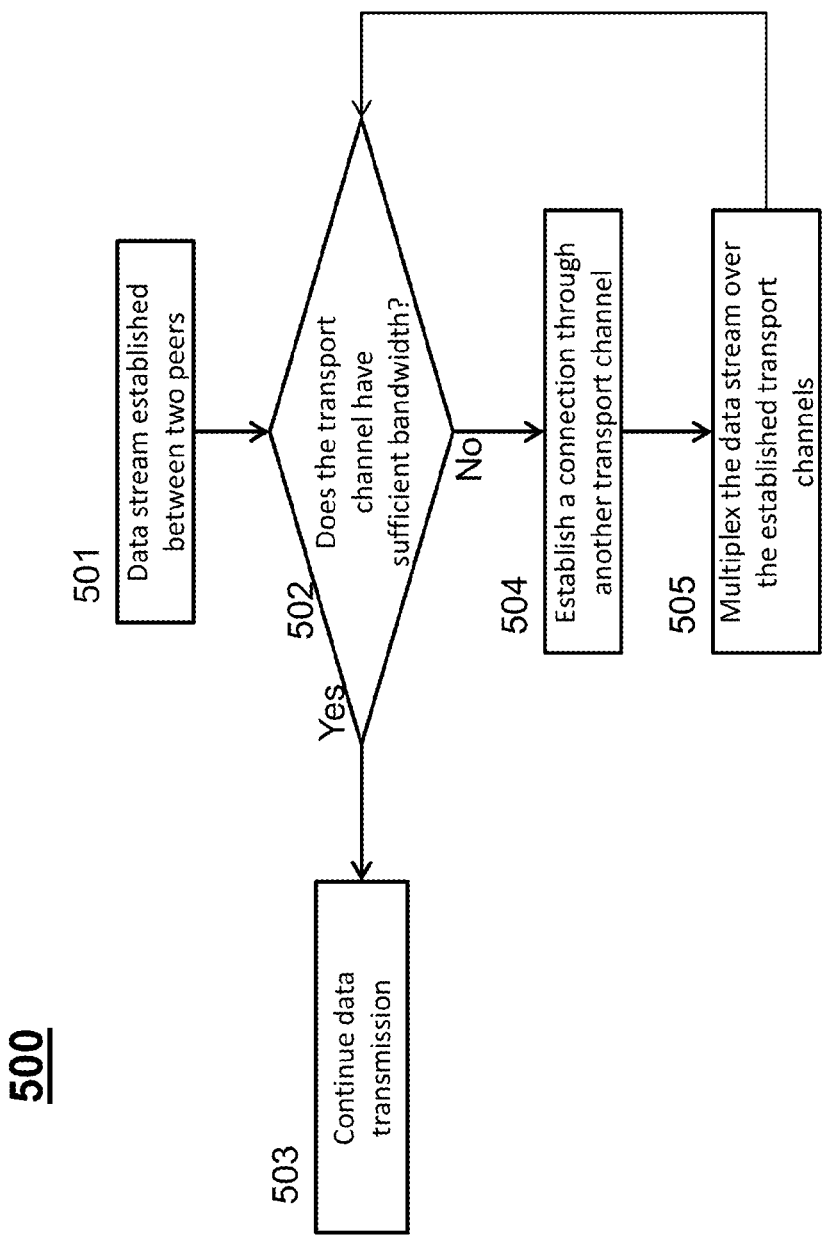
FIG. 5 depicts a flow diagram of a process for promoting a data stream to a transport channel in accordance with various aspects and principles of the present disclosure.

FIG. 5 depicts process 500 for promoting a transport channel according to some embodiments disclosed herein. As indicated by step 501, process 500 may establish a communication link and data stream between two peer electronic devices. Once a data stream is established 501, protocol process 500 may periodically check, in accordance with the optimizer of tunneling protocol stack 130, if the transport channel has sufficient bandwidth, as indicated in step 502. The sufficiency of bandwidth may be determined, in various embodiments, by factors such as, for example, data transmission rate required by the application in use, data transmission rate required by other applications running on the originating device, priority of data transmission of various processes running on the originating device, and so forth. If it is determined that the transport channel has sufficient bandwidth, data transmission is continued uninterrupted, as indicated in step 503, via that transport channel.

In some instances, the total bandwidth of the transport channel may be insufficient to carry the stream as indicated by the decision No after step 502. In such instances, process 500, in accordance with the optimizer may establish at least one other transport channel, as indicated in step 504, to balance the load and may promote the streams to the transport channel as a preferred route over which to transmit packets. The optimizer may, then, appropriately multiplex the data stream over all the established channels, as indicated in step 505. A periodic check may be performed in some embodiments, to check if the more than one transport channels provide sufficient bandwidth, as in step 502.

In some instances, the set of transport channels to an electronic device provides more bandwidth than is used by the set of all streams transmitting data to the remote device. In such instances, the transport optimizer may close or demote transport channels with higher energy-per-bit requirement or transport channels with lower bandwidth. In some embodiments, the transport optimizer may demote a transport channel when it is no longer used by a stream. In various embodiments, the time from the last stream's use of a transport channel to the closing of the transport channel may be dependent on whether the presence of the transport channel significantly impedes the use of the network medium. For example, in an embodiment where one of the transport channels is BlueTooth, the limit of network connections available from a piconet limits the time a Bluetooth channel is held open for a TCP/IP connection over an Ethernet network interface.

In various embodiments, when the tunneling protocol stack determines that a significantly increased bandwidth, or a significantly decreased monetary or energy cost will result from the establishment of a new transport channel between the local device and another device, a promote operation may be selected by the optimizer. The optimizer may perform a local simulation of the bandwidth distribution with various new transport channels enabled. It may share the results of this simulation with other connected protocol stack instances to attempt to construct a more balanced network load. In some embodiments, the simulation may take into accounts factors such as, for example, the quality of service requirements of the current open streams, minimum bandwidth, minimum latency, whether isochronous delivery times can be met, energy cost per bit of a transport, the monetary cost per bit of a transport, the theoretical and historical bandwidth of a transport, any other hints available to the stack from external sources, and the like.

In some embodiments, a simple simulation for the metrics of the required quality of the streams may result in a substantial improvement of one of the required parameters without unacceptable degradation of another. In such embodiments, the tunneling protocol stack may establish the new transport channel. Additionally, the tunneling protocol may set the newly established transport channel as the most desirable transport channel to select during the packet routing decision for some subset of streams to be potentially carried over that transport channel. At a relatively lower periodicity, the tunneling protocol stack may request optimization records from its immediate peers using a control channel and run a more detailed simulation looking for more optimal network topologies. There may be situations when optimization on two devices is at odds, resulting in astable or metastable oscillatory behavior such that transport channels bounce between active and inactive states. For avoiding such bouncing between active and inactive states, the tunneling protocol stack may use historical records of prior transport channel demotions to attenuate the frequency of promotion requests.

In some embodiments, a transport channel may be closed if no streams are sending data over the transport channel. The determination of the time to close is dependent on the transmission of the control packets on the stream requesting retry. Each stream may receive a packet past the current sequence number it has received. At the end of a predetermined retry period, a control packet requesting retry is transmitted. If a reply is not received, a subsequent control packet requesting retry may be transmitted after an additional elapsed time period greater than the prior time period forming an increasing geometric progression. The time value is reset when a reply is received on the transport channel. The transport channel may be closed when the time between retries naturally extends beyond the minimum time to close the transport over the particular network medium for both sides of the transport channel. Any further retry attempts may not result in a fail-over state. However, if any attempt to transmit new data packets results in a fail-over state. Such packets may cause the stream or streams to pause, resulting in the tunneling protocol attempting to resume those streams.

Figure 6:
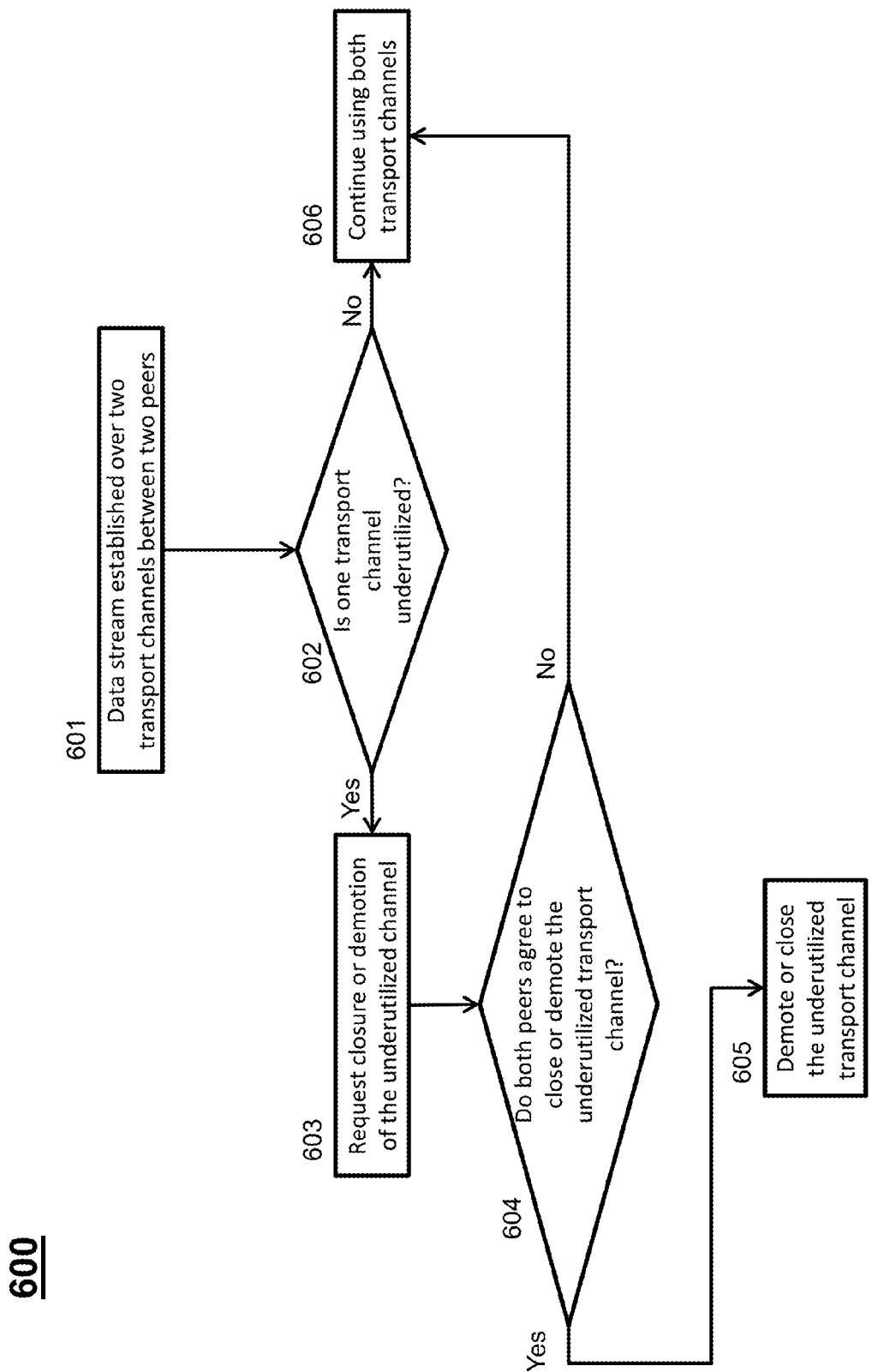
FIG. 6 depicts a flow diagram of a process for demoting a transport channel in accordance with various aspects and principles of the present disclosure.

With this said, FIG. 6 depicts process 600 for demoting a transport channel. When a data stream between two peer electronic devices is established, as depicted in step 601, process 600 in accordance with the optimizer of the tunneling protocol stack 130, may periodically check if the transport channel is underutilized (or unutilized) as depicted by step 602. If neither of the transport channels is being underutilized, as indicated by No after step 602, the data stream can be maintained over both the transport channels as depicted in step 606.

In instances where the optimizer determines that one of the transport channels is being underutilized (or unutilized), as indicated by Yes after step 602, it may send a request to the peer electronic device to demote or close the underutilized (or unutilized) transport channel as indicated by step 603. The tunneling protocol stack 130 may then check if both the peer electronic devices agree to demote or close the underutilized (or unutilized) transport channel as depicted by step 604. If the tunneling protocol instances on the two electronic devices agree, as indicated by Yes after step 604, that the transport channel is underutilized or unutilized, the transport channel is demoted or closed as indicated in step 605.

In some embodiments, it may be possible that the optimization algorithm on the electronic devices may come to opposing decisions based on unique local data available to the particular electronic device. In such embodiments, the transport channel is kept open and the data stream is maintained over both the transport channels as indicated in step 606.

The tunneling protocol stack may send a priority classification along with the demotion request over a control stream in some instances. In various embodiments, an electronic device with the higher priority reason for vetoing a demotion may be allowed to close its selected transport. The priority classifications may include, but are not limited to, bandwidth required by other protocols, battery-low conditions, hardware sleep-states on the device, a network medium with limited connection fan-in or fan-out that wants to be dedicated to another device connection, and the like. In embodiments where agreement is not possible, the demotion may not proceed automatically.

In some embodiments, a wireless radio may act as the sole carrier of data for a transport channel to a remote electronic device and the wireless radio may provide an interface through which a distance or RSSI (received signal strength indicator) can be measured. In such embodiments, the tunneling protocol stack may determine the approximate instantaneous slope of the distance or signal strength indicator and use it to predict a time at which the transport channel may become unreliable. If such a state is predicated to occur in the time required to bring up the transport channel taking the least time to establish, the tunneling protocol stack may attempt to establish a different transport channel to the remote electronic device prior to the loss or degradation of the signal. If the newly connected transport channel is not required it will be eventually disconnected through the normal demotion process of the protocol stack's transport optimizer.

Figure 7:
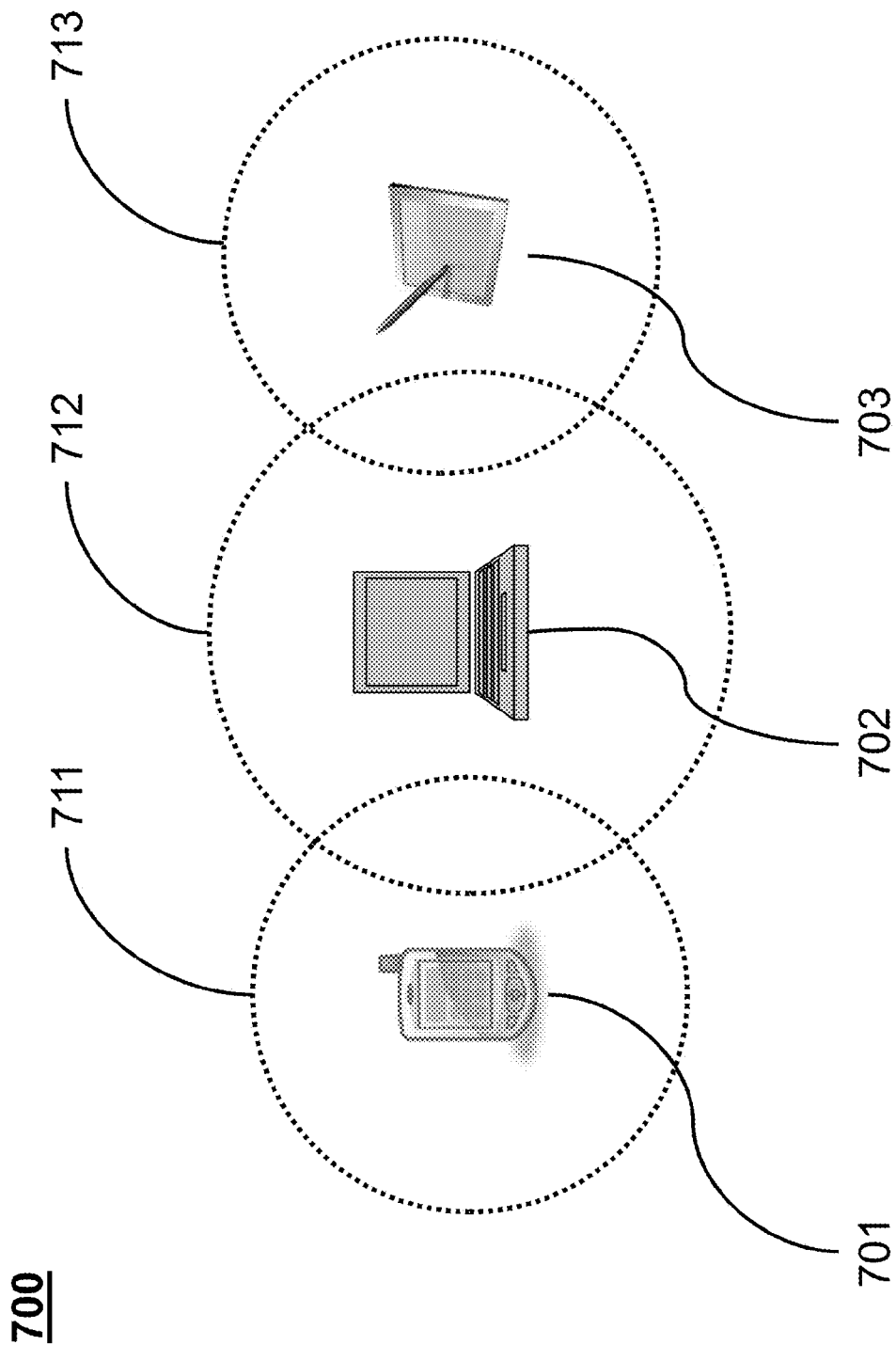
FIG. 7 depicts a neighborhood of electronic devices capable of peer-to-peer communication in accordance with various aspects and principles of the present disclosure.

FIG. 7 shows a neighborhood of electronic devices capable of peer-to-peer communication. In various embodiments, the neighborhood 700 may include a plurality of wired or wireless electronic devices, each having a discovery range. In various embodiments, the discovery range may be dependent on location information provided by a user of the electronic device, the number and types of the wireless radios available to the devices, the physical environment in which the electronic devices are present, number of connections already established by one or more of the electronic devices in the neighborhood, presence of a firewall, particular sub-domain in which a particular electronic devices is present, location of the closest router that is connected to a particular electronic device, number of network hops required to connect to a certain electronic device, and so on.

In some embodiments, the discovery range of the various electronic devices may depend on factors such as, for example, the difference between the absolute geographic locations of the devices as determined by a global positioning system or other means for determining absolute position or the difference between the absolute altitudes of the devices as determined by an embedded altimeter or by a global positioning system.

In some embodiments, the discovery range may depend on the RSSI of the signal of the transmitting device as determined by the receiving device or the time of arrival of a packet as compared to its time of transmission where these times can be determined precisely (within a few microseconds) and where both devices have access to a common source of timeout of agreement by no more than a few hundred nanoseconds. In other embodiments, the discovery range may depend on the tracking of the precise carrier frequency of a radio signal and the historical measurement of the Doppler shift of the carrier from the pilot frequency integrated over time to determine whether a device is in motion towards or away from the measuring device and the duration and approximate velocity of that motion.

In embodiments using a short-range communications medium (e.g. Near-Field Communication [NFC], inductive loop, infrared transceiver), the discovery range may depend on physical distance between the two electronic devices because at the time the transfer over that medium completes, the devices using that medium must have been co-located within a certain minimal range determined by the maximal range of that medium.

In yet other embodiments, the discovery range may be dependent on an inference about the current location of devices as determined using information about well-known access points, fixed devices (e.g. store kiosks), and network proximities (as determined by tracing IP traffic), or an inference about the current location of devices as determined using active on-board video or audio equipment extrapolating position from the presence of, for example, known landmarks, signs, constellations or other visual or auditory cues from a stored database of such cues. In further embodiments, the sharing of information with a dedicated device providing a fixed location that shares this information with devices in communication range (e.g. a dedicated device at an airport terminal, bus station, or other public or private facility).

In embodiments where an electronic device known to be in proximity of another electronic device with a known position determined by other means, such information may be applied transitively to approximate absolute positions for co-located devices.

Returning to FIG. 7, the three electronic devices 701, 702, and 703 have maximum discovery range illustrated by 711, 712, and 713 respectively. It will be appreciated that while three wireless electronic devices 701, 702, and 703 are shown in FIG. 7, the neighborhood 700 may include wireless or wired electronic devices.

In an embodiment depicted in the FIG. 7, the discovery range 712 of electronic device 702 overlaps with the discover range 711 and discover range 713 of electronic devices 701 and 703 respectively. As such, the electronic device 702 may discover both electronic device 701 and electronic device 703. Because, the discovery ranges 711 and 713 of electronic devices 701 and 703 respectively do not overlap, electronic device 701 may only discover electronic device 702, but not electronic device 703. Likewise, electronic device 703 may only discover electronic device 702, but not electronic device 701.

However, electronic device 702 may share electronic device 703 with device 701 with an added level of indirection. In such an instance, the electronic device 702 also effectively shares electronic device 701 with electronic device 703 with the same level of indirection. In this case, the levels of indirection between different devices are listed in Table 1.

TABLE 1

Level of indirection between different devices shown in FIG. 7.

| Device 1 | Device 2 | Level of Indirection |
|----------|----------|----------------------|
| A | B | 1 |
| A | C | 2 |
| B | A | 1 |
| B | C | 1 |
| C | A | 2 |
| C | B | 1 |

In various embodiments, the protocol stack 130 may have a communication engine for constructing an approximate spatial representation of various electronic devices in a neighborhood, predicting best possible pairs of endpoints for establishing a connection between a pair of electronic devices in a neighborhood, and/or determining the best possible path for relaying information between a set of electronic devices in a neighborhood.

In some embodiments, the neighborhood data may be augmented to include a count of the number of level of indirection. In such embodiments, the communication engine may merge the database on the original electronic device containing the record of endpoints of the electronic devices in the vicinity with the records of the local electronic device.

When an electronic device receives data from another electronic device in the vicinity, the endpoints it receives from that electronic device have a level of indirection one greater than the level of indirection of the endpoints stored on the original electronic device. As such, an electronic device's own endpoints have an intrinsic level of indirection of zero. The communication engine may store endpoints shared by two electronic devices which are the same but have differing levels of indirection with the lowest level of indirection in an electronic device's local database of endpoints.

In some embodiments, an electronic device may discover endpoints with level of indirection greater than a predetermined threshold. In other embodiments, the discovered endpoints may result in the storage requirements of the collection of endpoints to grow larger than a certain threshold in the electronic device's database. In such embodiments, the communication may decide not to store the endpoints with level of indirection greater than a predetermined threshold, or endpoints that result in the storage requirements to grow larger than a threshold. The communication engine, in some cases, may decide to share the endpoint lists of all electronic devices in the vicinity transitively. As such, a collection of the electronic devices in the vicinity may include all electronic devices that the proximal electronic device sees. This collection of electronic devices and endpoints constitutes the neighborhood of the device to a certain depth of indirection.

Various electronic devices in a neighborhood may establish connections with other discoverable electronic devices through one or more network media available to them. In some embodiments, an originating electronic device's network medium may provide information about distance. Alternatively, or additionally, the network medium may triangulate direction. In such embodiments, the communication engine may augment information about the neighborhood of an electronic device to include information about the relative distance or RSSI to each network medium represented by an endpoint from the electronic device that discovered it and/or in what direction that electronic device lies with respect to the originating electronic device. Additionally, communication engine may derive the precise physical proximity of an electronic device in a collection of electronic devices constituting the neighborhood using hints about the absolute location of the originating electronic device may augment the endpoint data.

The communication engine may, in some embodiments, use the neighborhood information to construct an approximate spatial representation of electronic devices around a given electronic device. An electronic device's location may be defined by a fuzzy-valued vector identifying the certainty of measurement of another electronic device's location in terms of the distance to the device, and the radial angle and relative elevation of the electronic device. This information may be published through Application Programming Interfaces (APIs). Alternatively, the communications engine may use this information to make optimal decisions about connections between these electronic devices.

In certain embodiments, the process of the communication engine may use the neighborhood and relative position information to make predictions about the best possible pairs of endpoints to use to establish network connections between electronic devices. In some embodiments, the communication engine may further use such information to determine the most efficient path to relay information or repair damage to the reliable data flow of a mesh network built from the edges of a connection graph built from the connections between network media in the neighborhood. Additionally, in some embodiments, the communication engine may relay changes to the metadata attached to the neighboring endpoints to provide predictions about when devices are about to enter proximity or leave proximity allowing the establishment or forcing the loss of network connections.

In various embodiments, a physical network medium may intrinsically provide a mechanism for discovering information from another device in some form of physical or virtual proximity metric such that the neighborhood information may be augmented to include new data. In such embodiments, the communication engine may augment the discovered neighborhood information to include data which may be used to reconstruct the endpoints for each type of network medium. In some embodiments, such data may be translated from the data provided through the discovery mechanism into a standard format for each type of network medium identifying an address of an electronic device in the domain of the network medium (or endpoint) used to connect to the electronic device providing the discovery information.

In some embodiments, the communication device may update a collection of network endpoints based on the reported discovery data when a network medium on an electronic device becomes unavailable for use or when a new network medium becomes available. As such, the updated database may reflect the new list of endpoints and the times they the database was updated. Such a database may be made available on one or more of the peer-to-peer electronic devices or endpoints. In this way an electronic device may acquire local replicas of the discovered data from other electronic devices to which it is proximal (through physical distance in case of wireless medium or network hops in case of wired medium). Any network medium supporting discovery may be used to determine the endpoints of the other electronic device. For example, in some embodiments, an endpoint for a peer electronic device may be determined through the use of a STUN server and the data transfer may occur as UDP packets. In other embodiments, electronic devices may advertise their endpoints or services they provide.

Figure 8:
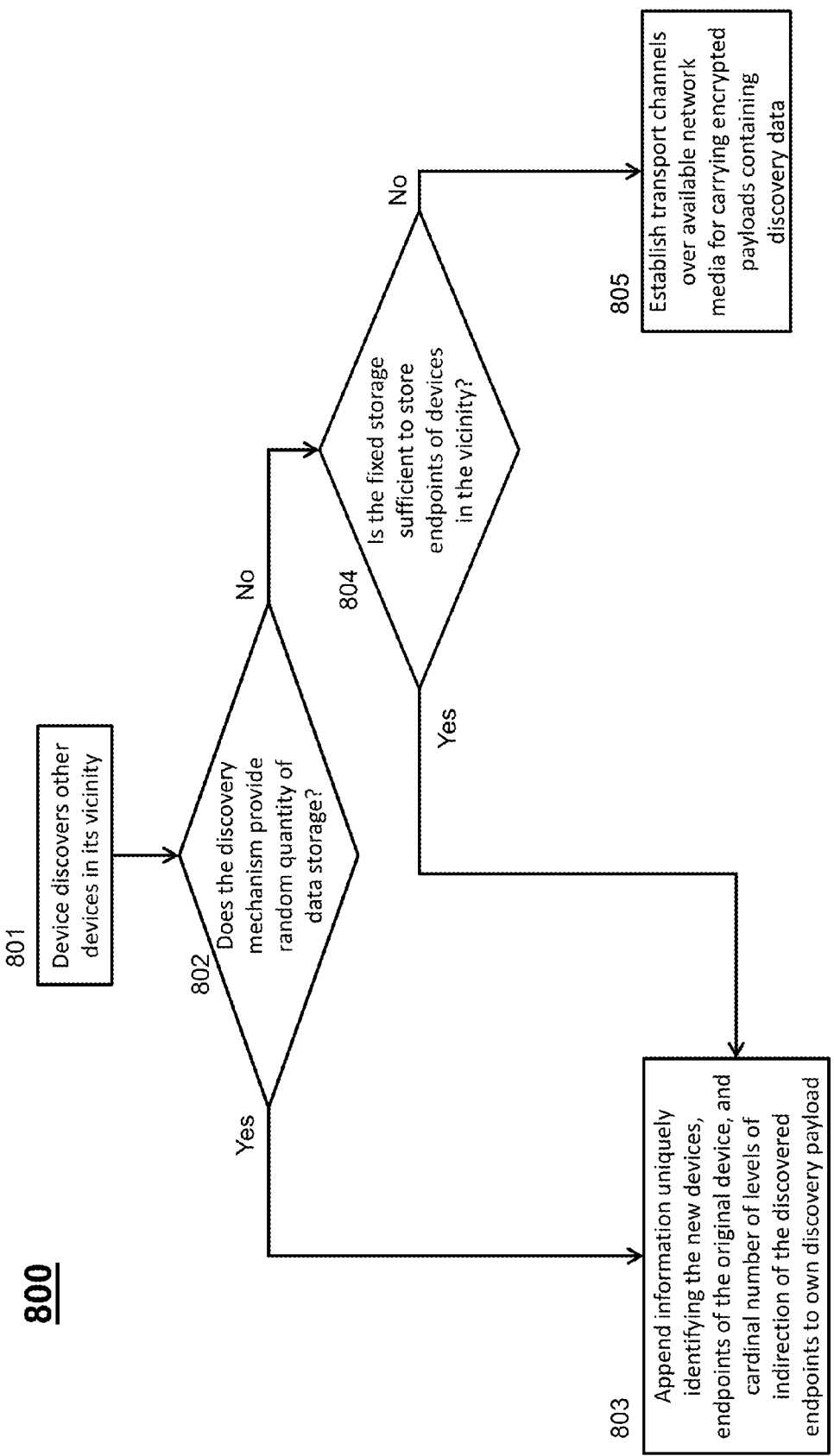
FIG. 8 depicts a flow diagram of a process for appending an endpoint database after discovering a new device in a neighborhood in accordance with various aspects and principles of the present disclosure.

FIG. 8 depicts a process of appending discovery database in accordance with various aspects and principles of the present disclosure. In step 801, an electronic device discovers other electronic devices in the vicinity (physical distance or network hops). The communication engine running on the electronic device then, in step 802, tries to determine if the discovery mechanism provides a random quantity of data storage for the discovery information. If the discovery mechanism provides a random quantity data storage (Yes), the communication engine appends the information uniquely identifying the electronic device, the endpoints of the original electronic device, and a cardinal number of levels of indirection of the discovered endpoint to discovery payload of the original electronic device as indicated in step 803.

In embodiments where the discovery mechanism does not provide random quantity of data storage (No), the communication engine may check if the fixed quantity of data storage is sufficient to store all the neighborhood information, as depicted in step 804. If the fixed quantity data storage of the discovery mechanism is not sufficient to store the endpoints of electronic devices in the vicinity (No), the communication engine may use the available network endpoints to establish transport over the available network media to carry encrypted payloads containing these endpoints, as in step 805. If the fixed quantity data storage of the discovery mechanism is sufficient to store the endpoints of electronic devices in the vicinity (Yes), the communication engines appends the information to discovery payload of the original electronic device as indicated in step 803.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Embodiments within the scope of the present disclosure may further include computer-readable media for carrying or having computer-executable instructions or data structures stored thereon. Such computer-readable media can be any available media that can be accessed by a general purpose or a special purpose computer. Such computer-readable media may include, but are not limited to, RAM, ROM, EEPROM, CD-ROM, or other optical disk storage, magnetic disk storage, or other magnetic storage devices, or any other medium which can be used to carry or store desired program code means in the form of computer-executable instructions or data structures. When information is transferred or provided over a network or another communications connection (either hardwired, wireless or a combination thereof) to a computer, the computer properly views the connection as a computer-readable medium. Thus, any such connection is properly termed as computer-readable medium. Combinations of the above should also be included within the scope of the computer-readable media.

Computer-executable instructions include, but are not limited to, instructions and data which cause a general purpose computer, a special purpose computer, or a special purpose processing device to perform a certain function or a group of functions. Computer-executable instructions also include program modules that are executed by computers in stand-alone or network environments. Generally, program modules include routines, programs, objects, components, data structures, and the like, that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

EXAMPLES

The following examples pertain to further embodiments:

Example 1 is a method of constructing an approximate spatial representation of electronic devices in a neighborhood of electronic devices. The method may include collecting data from electronic devices within a range, wherein the data comprises one or more of a unique identifier for an electronic device, endpoints of original electronic devices, and level of indirection of a discovered endpoint and building a data collection representing a neighborhood of electronic devices from the collected data.

Example 2 is the method of Example 1 wherein collecting data is based on the level of indirection for devices within the range.

Example 3 is the method of any one of Examples 1-2 optionally including sharing a list of endpoints with electronic devices in the neighborhood using wireless or wired discovery mechanisms.

Example 4 is the method of any one of Examples 1-3 optionally including storing the list of endpoints transitively over a plurality of electronic devices within the neighborhood by establishing network connections between the plurality of electronic devices and distributing the list of endpoints over the plurality of electronic devices.

Example 5 is the method of any one of Examples 1-4 wherein the data further comprises relative distance or received signal strength indication.

Example 6 is the method of any one of Examples 1-5 wherein the data further comprises information about physical location of the electronic device.

Example 7 is the method of any one of Examples 1-6 wherein a local endpoint for an electronic device has a level of indirection of zero.

Example 8 is the method of any one of Examples 1-7 wherein the data collection is published through an Application Programming Interface (API).

Example 9 is a method for predicting best pairs of endpoints for establishing a network connection between electronic devices in a neighborhood of electronic devices. The method may include collecting data from electronic devices within a range, wherein the data comprises one or more of a unique identifier for an electronic device, endpoints of original electronic devices, level of indirection of a discovered endpoint, and relative distance or received signal strength indication, building a data collection representing a neighborhood of electronic devices from the collected data, and constructing an approximate spatial representation of electronic devices in a neighborhood of devices using the collected data.

Example 10 is the method of Example 9 wherein collecting data is based on the level of indirection for devices within the range.

Example 11 is the method of any one of Examples 9-10 wherein a local endpoint for an electronic device has a level of indirection of zero.

Example 12 is the method of any one of Examples 9-11 optionally including sharing a list of endpoints with electronic devices in the neighborhood using wireless or wired discovery mechanisms.

Example 13 is the method of any one of Examples 9-12 optionally including storing the list of endpoints transitively over a plurality of electronic devices within the neighborhood by establishing network connections between the plurality of electronic devices and distributing the list of endpoints over the plurality of electronic devices.

Example 14 is the method of any one of Examples 9-13 wherein the data collection is published through an Application Programming Interface (API).

Example 15 is the method of any one of Examples 9-14 optionally including predicting when one or more electronic devices are entering or leaving proximity of a particular electronic device.

Example 16 is the method of any one of Examples 9-15 optionally including maintaining data flow between electronic devices in a neighborhood based on the prediction of one or more electronic devices entering or leaving proximity of a particular electronic device.

Example 17 is an electronic device including a processor, in communication with a memory, for executing instructions to (i) collect data from electronic devices within a range, wherein the data comprises one or more of a unique identifier for an electronic device, endpoints of original electronic devices, and level of indirection of a discovered endpoint, and (ii) build a data collection representing a neighborhood of electronic devices from the collected data.

Example 18 is the electronic device of claim 17 wherein collection of the data is based on the level of indirection for devices within the range.

Example 19 is the electronic device of any one of Examples 17-18 wherein a local endpoint for an electronic device has a level of indirection of zero.

Example 20 is the electronic device of any one of Examples 17-19 wherein the instructions further comprise sharing a list of endpoints with electronic devices in the neighborhood using wireless or wired discovery mechanisms.

Example 21 is the electronic device of any one of Examples 17-20 wherein the instructions further comprise storing the list of endpoints transitively over a plurality of electronic devices within the neighborhood by establishing network connections between the plurality of electronic devices and distributing the list of endpoints over the plurality of electronic devices.

Example 22 is the electronic device of any one of Examples 17-21 wherein the data further comprises relative distance or received signal strength indication.

Example 23 is the electronic device of any one of Examples 17-22 wherein the data further comprises information about physical location of the electronic device.

Example 24 is the electronic device of any one of Examples 17-23 wherein the instructions further comprise constructing an approximate spatial representation of electronic devices in a neighborhood of devices using the collected data.

Example 25 is an electronic device including means for performing a method of any one of Examples 1-16.

Example 26 is a computer-readable medium comprising computer-readable code physically embodied thereon which, when executed by a processor, causes the processor to perform a method of any one of Examples 1-16.

Example 27 is a system for constructing an approximate spatial representation of electronic devices in a neighborhood of electronic devices, the system comprising a plurality of data sources, wherein the data comprises one or more of a unique a plurality of data sources, wherein the data comprises one or more of a unique identifier for an electronic device, endpoints of original electronic devices, and level of indirection of a discovered endpoint and an electronic device of any one of Examples 17-25.

Example 28 is a system for constructing an approximate spatial representation of electronic devices in a neighborhood of electronic devices, the system comprising a plurality of data sources, wherein the data comprises one or more of unique a plurality of data sources, wherein the data comprises one or more of a unique identifier for an electronic device, endpoints of original electronic devices, and level of indirection of a discovered endpoint and the computer-readable medium of Example 26.

Example 29 is a method of constructing an approximate spatial representation of electronic devices in a neighborhood of electronic devices. The method may include collecting data from electronic devices within a range, wherein the data comprises one or more of a unique identifier for an electronic device, endpoints of original electronic devices, and level of indirection of a discovered endpoint and building a data collection representing a neighborhood of electronic devices from the collected data.

Example 30 is the method of Example 29 wherein collecting data is based on the level of indirection for devices within the range.

Example 31 is the method of Example 29 optionally including sharing a list of endpoints with electronic devices in the neighborhood using wireless or wired discovery mechanisms.

Example 32 is the method of Example 31 optionally including storing the list of endpoints transitively over a plurality of electronic devices within the neighborhood by establishing network connections between the plurality of electronic devices and distributing the list of endpoints over the plurality of electronic devices.

Example 33 is the method of Example 29 wherein the data further comprises relative distance or received signal strength indication.

Example 34 is the method of Example 29 wherein the data further comprises information about physical location of the electronic device.

Example 35 is the method of Example 29 wherein a local endpoint for an electronic device has a level of indirection of zero.

Example 36 is the method of Example 29 wherein the data collection is published through an Application Programming Interface (API).

Example 37 is a method for predicting best pairs of endpoints for establishing a network connection between electronic devices in a neighborhood of electronic devices. The method may include collecting data from electronic devices within a range, wherein the data comprises one or more of a unique identifier for an electronic device, endpoints of original electronic devices, level of indirection of a discovered endpoint, and relative distance or received signal strength indication, building a data collection representing a neighborhood of electronic devices from the collected data, and constructing an approximate spatial representation of electronic devices in a neighborhood of devices using the collected data.

Example 38 is the method of Example 37 wherein collecting data is based on the level of indirection for devices within the range.

Example 39 is the method of Example 37 wherein a local endpoint for an electronic device has a level of indirection of zero.

Example 40 is the method of Example 37 optionally including sharing a list of endpoints with electronic devices in the neighborhood using wireless or wired discovery mechanisms.

Example 41 is the method of Example 40 optionally including storing the list of endpoints transitively over a plurality of electronic devices within the neighborhood by establishing network connections between the plurality of electronic devices and distributing the list of endpoints over the plurality of electronic devices.

Example 42 is the method of Example 37 wherein the data collection is published through an Application Programming Interface (API).

Example 43 is the method of Example 37 optionally including predicting when one or more electronic devices are entering or leaving proximity of a particular electronic device.

Example 44 is the method of Example 43 optionally including maintaining data flow between electronic devices in a neighborhood based on the prediction of one or more electronic devices entering or leaving proximity of a particular electronic device.

Example 45 is an electronic device including a processor, in communication with a memory, for executing instructions to (i) collect data from electronic devices within a range, wherein the data comprises one or more of a unique identifier for an electronic device, endpoints of original electronic devices, and level of indirection of a discovered endpoint, and (ii) build a data collection representing a neighborhood of electronic devices from the collected data.

Example 46 is the electronic device of Example 45 wherein collection of the data is based on the level of indirection for devices within the range.

Example 47 is the electronic device of Example 45 wherein a local endpoint for an electronic device has a level of indirection of zero.

Example 48 is the electronic device of Example 45 wherein the instructions further comprise sharing a list of endpoints with electronic devices in the neighborhood using wireless or wired discovery mechanisms.

Example 49 is the electronic device of Example 48 wherein the instructions further comprise storing the list of endpoints transitively over a plurality of electronic devices within the neighborhood by establishing network connections between the plurality of electronic devices and distributing the list of endpoints over the plurality of electronic devices.

Example 50 is the electronic device of Example 45 wherein the data further comprises relative distance or received signal strength indication.

Example 51 is the electronic device of Example 45 wherein the data further comprises information about physical location of the electronic device.

Example 52 is the electronic device of Example 45 wherein the instructions further comprise constructing an approximate spatial representation of electronic devices in a neighborhood of devices using the collected data.

What is claimed is:

1. A method of constructing an approximate spatial representation of electronic devices in a neighborhood of electronic devices, the method comprising:
  collecting data from electronic devices within a range, wherein the data comprises one or more of a unique identifier for an electronic device, endpoints of original electronic devices, and level of indirection of a discovered endpoint, wherein the endpoints of at least one of the original electronic devices are addresses corresponding to different network protocols supported by the at least one of the original electronic devices; and building a data collection representing a neighborhood of electronic devices from the collected data, wherein the approximate spatial representation of the electronic devices around one of the electronic devices is constructed based on the data collection.

2. The method of claim 1, wherein collecting data is based on the level of indirection for devices within the range.

3. The method of claim 1, further comprising sharing a list of endpoints with electronic devices in the neighborhood using wireless or wired discovery mechanisms.

4. The method of claim 3, further comprising storing the list of endpoints transitively over a plurality of electronic devices within the neighborhood by establishing network connections between the plurality of electronic devices and distributing the list of endpoints over the plurality of electronic devices.

5. The method of claim 1, wherein the data further comprises relative distance or received signal strength indication.

6. The method of claim 1, wherein the data further comprises information about physical location of the electronic device.

7. The method of claim 1, wherein a local endpoint for an electronic device has a level of indirection of zero.

8. The method of claim 1, wherein the data collection is published through an Application Programming Interface (API).

9. A method for predicting best pairs of endpoints for establishing a network connection between electronic devices in a neighborhood of electronic devices, the method comprising:

collecting data from electronic devices within a range, wherein the data comprises one or more of a unique identifier for an electronic device, endpoints of original electronic devices, level of indirection of a discovered endpoint, and relative distance or received signal strength indication, wherein the endpoints of at least one of the original electronic devices are addresses corresponding to different network protocols supported by the at least one of the original electronic devices;

building a data collection representing a neighborhood of electronic devices from the collected data, wherein a desired pair of endpoints for establishing a network connection between at least two of the electronic devices is based on the data collection; and constructing an approximate spatial representation of electronic devices around one of the electronic devices in a neighborhood of devices using the collected data.

10. The method of claim 9, wherein collecting data is based on the level of indirection for devices within the range.

11. The method of claim 9, wherein a local endpoint for an electronic device has a level of indirection of zero.

12. The method of claim 9, further comprising sharing a list of endpoints with electronic devices in the neighborhood using wireless or wired discovery mechanisms.

13. The method of claim 12, further comprising storing the list of endpoints transitively over a plurality of electronic devices within the neighborhood by establishing network connections between the plurality of electronic devices and distributing the list of endpoints over the plurality of electronic devices.

14. The method of claim 9, wherein the data collection is published through an Application Programming Interface (API).

15. The method of claim 9, further comprising predicting when one or more electronic devices are entering or leaving proximity of a particular electronic device.

16. The method of claim 15, further comprising maintaining data flow between electronic devices in a neighborhood based on the prediction of one or more electronic devices entering or leaving proximity of a particular electronic device.

17. An electronic device comprising:

a processor, in communication with a memory, for executing instructions to:

collect data from electronic devices within a range, wherein the data comprises one or more of a unique identifier for an electronic device, endpoints of original electronic devices, and level of indirection of a discovered endpoint, wherein the endpoints of at least one of the original electronic devices are addresses corresponding to different network protocols supported by the at least one of the original electronic devices; and build a data collection representing a neighborhood of electronic devices from the collected data, wherein an approximate spatial representation of the electronic devices around one of the electronic devices is constructed based on the data collection.

18. The electronic device of claim 17, wherein collection of the data is based on the level of indirection for devices within the range.

19. The electronic device of claim 17, wherein a local endpoint for an electronic device has a level of indirection of zero.

20. The electronic device of claim 17, wherein the instructions further comprise sharing a list of endpoints with electronic devices in the neighborhood using wireless or wired discovery mechanisms.

21. The electronic device of claim 20, wherein the instructions further comprise storing the list of endpoints transitively over a plurality of electronic devices within the neighborhood by establishing network connections between the plurality of electronic devices and distributing the list of endpoints over the plurality of electronic devices.

22. The electronic device of claim 17, wherein the data further comprises relative distance or received signal strength indication.

23. The electronic device of claim 17, wherein the data further comprises information about physical location of the electronic device.

24. The electronic device of claim 17, wherein the instructions further comprise constructing the approximate spatial representation of electronic devices in a neighborhood of devices using the collected data.

* * * * *